US007571293B1

(12) United States Patent
LeCrone et al.

(10) Patent No.: US 7,571,293 B1
(45) Date of Patent: Aug. 4, 2009

(54) EMULATION OF POINT-IN-TIME DATA COPYING OPERATIONS

(75) Inventors: Douglas E. LeCrone, Hopkinton, MA (US); Bruce Alan Pocock, Titusville, FL (US); Paul Linstead, Shrewsbury, MA (US); Roger A. Ouellette, Whitinsville, MA (US)

(73) Assignee: EMC Corporation, Hopkinton, MA (US)

( * ) Notice: Subject to any disclaimer, the term of this patent is extended or adjusted under 35 U.S.C. 154(b) by 397 days.

(21) Appl. No.: 11/472,685

(22) Filed: Jun. 22, 2006

(51) Int. Cl.
*G06F 13/00* (2006.01)
*G06F 13/28* (2006.01)
*G06F 9/455* (2006.01)
(52) U.S. Cl. ........................ 711/162; 703/23
(58) Field of Classification Search ............ 711/162; 703/23
See application file for complete search history.

(56) References Cited

U.S. PATENT DOCUMENTS

| 6,434,681 | B1 | 8/2002 | Armangau | |
|---|---|---|---|---|
| 7,277,844 | B2 * | 10/2007 | Perrin et al. | 703/23 |
| 2003/0197963 | A1 | 10/2003 | Wagner | |
| 2005/0114402 | A1 * | 5/2005 | Guthrie | 707/200 |
| 2006/0123189 | A1 * | 6/2006 | Bitner et al. | 711/111 |

OTHER PUBLICATIONS

"FlashCopy", IBM TotalStorage Enterprise Storage Server: Implementing ESS Copy Services with IBM eServer, 2004. (pp. 14 to 17, 31 to 68).

"Z/Architecture Principles of Operation", IBM Corp., 2005. (pp. 13-1 to 13-10, 14-1 to 14-22, 15-1 to 15-48).

\* cited by examiner

*Primary Examiner*—Matt Kim
*Assistant Examiner*—Edward J Dudek
(74) *Attorney, Agent, or Firm*—BainwoodHuang

(57) ABSTRACT

A host computer system (host) includes an application that generates I/O commands for a first type of point-in-time (PIT) copy operation, and an I/O subsystem coupled to a data storage system capable of performing a second type of PIT copy operation. The host processes the I/O commands as part of an emulation of the first type of PIT copy operation, including determining whether the I/O commands require modification for the emulation, and if so whether they are of a back-end type or an out-of-band type. The I/O commands that do not require modification are processed without modification via the I/O subsystem. For the back-end I/O commands, (i) an intercept condition is set, (ii) the I/O commands are processed via the I/O subsystem, and (iii) upon completion with the intercept condition set, the results are modified so as to indicate to the application that the first type of PIT copy operation can be performed on the storage volumes. For the out-of-band I/O commands, (i) corresponding commands of the second type of PIT copy operation are processed via the I/O subsystem in lieu of the out-of-band I/O commands, and (ii) upon completion of the substituted I/O commands, corresponding results are returned to the application as though the out-of-band I/O commands had been processed by the I/O subsystem. Using this technique, a host that initiates only PIT copying operations of the first type can be used with storage systems that support second-type PIT copying operations.

14 Claims, 4 Drawing Sheets

EMULATION OF POINT-IN-TIME DATA COPYING OPERATIONS

BACKGROUND

The invention pertains to the field of data storage systems, and more particularly to point-in-time copying operations in data storage systems.

It is known to perform so-called 'point-in-time' copying of data in data storage systems for a variety of purposes, including data backup, data mining/analysis, etc. In a point-in-time copying operation, a source storage volume as it exists at the beginning of the operation is copied to a target volume. Upon completion, the target volume contains an exact copy of the source volume as existing at the time the copy operation was initiated. Various known mechanisms may be used to handle ongoing data reads and writes while the copying operation is in progress.

In data processing systems employing so-called "mainframe" host computers, such as zSeries® servers sold by IBM Corporation, a particular point-in-time copying utility known as Flashcopy® may be utilized. Flashcopy provides a point-in-time copy of a logical volume (in whole or in part) with almost instant availability of both the source and target volumes for continuing data accesses. The Flashcopy operation includes an "establish" phase in which a Flashcopy relationship is established between source and target volumes, followed by a "copy" phase in which the data is copied from source to target volume. By default, copying occurs in the background such that normal I/O processing can continue. The Flashcopy relationship is automatically terminated once all source volume tracks have been copied to the target volume, unless an option referred to as "persistent Flashcopy" is utilized, in which case the relationship must be explicitly ended or withdrawn by an application program. The Flashcopy functionality is carried out primarily by a controller in response to Flashcopy I/O commands issued by an application program in the host computer.

An alternative point-in-time data copying utility known by the name SNAP is sold by EMC Corporation. SNAP is supported on EMC's SYMMETRIX® storage systems. Beyond the firmware support within the SYMMETRIX systems, SNAP relies on an application program interface (API) that is incorporated into a host computer. SNAP functions are invoked via the SNAP API, which communicates with the SNAP firmware within the SYMMETRIX to carry out the functions. SNAP is largely a superset of Flashcopy, i.e., SNAP includes the main features of Flashcopy as well as additional features not included in Flashcopy. Among other things, SNAP has the capability of performing point-in-time copying of volumes that are mirrored utilizing Symmetrix Remote Data Facility (SRDF) also sold by EMC Corporation. Although Flashcopy has analogous functionality, it is limited to use with a proprietary remote copying technique known as Peer-to-Peer Remote Copy (PPRC) and does not support SRDF for example. Flashcopy also has other limitations not present in SNAP.

SUMMARY

Many data processing systems that can benefit from the utilization of one type of point-in-time copying service, such as SNAP, may include host computers that generate commands according to another type of point-in-time copying service such as Flashcopy. It would be desirable to enable the use of the first type of point-in-time copying service in such systems without requiring any significant change to the host computers, such that users' investment in host computers is protected while providing expanded functionality and/or performance.

In accordance with the present invention, a data processing system is disclosed that includes a host computer system having (i) an application that generates input/output (I/O) commands for a first type of point-in-time (PIT) copy operation, and (ii) an I/O subsystem coupled to a data storage system that is capable of performing a second type of PIT copy operation. The first type of PIT copy operation is directed to respective storage volumes of the data storage system. In an illustrative embodiment, the first and second types of PIT copying operations are Flashcopy and SNAP operations respectively.

The host computer processes the I/O commands as part of an emulation of the first type of PIT copy operation. The processing includes determining whether the I/O commands require modification for purposes of the emulation, and if so whether they are of a back-end type or an out-of-band type. The back-end I/O commands require modification of results reported to the application upon completion, and the out-of-band I/O commands require substitution by corresponding I/O commands of the second type of PIT copy operation for purposes of the emulation. Generally, the results for the back-end I/O commands are modified to indicate that the first type of PIT copying operation can be performed on the volumes to which the I/O commands are directed, even though the data storage system may not support the first type of PIT copying operation. The substitution for the out-of-band commands is to perform an analogous function utilizing the support available within the data storage system for the second type of PIT copying operation. Several specific examples are given in the description below.

For those of the I/O commands that do not require modification for purposes of the emulation, such I/O commands are processed without modification via the I/O subsystem of the host computer. For the back-end I/O commands, (i) an intercept condition is set, (ii) the back-end I/O commands are processed via the I/O subsystem, and (iii) upon completion of the back-end I/O commands with the intercept condition set, the results of the back-end I/O commands are modified so as to indicate to the application that the first type of PIT copy operation can be performed on the storage volumes to which the first type of PIT copy operation is directed. For the out-of-band I/O commands, (i) corresponding commands of the second type of PIT copy operation are processed via the I/O subsystem in lieu of the out-of-band I/O commands, and (ii) upon completion of the substituted I/O commands, corresponding results are returned to the application as though the out-of-band I/O commands had been processed by the I/O subsystem.

Using the disclosed technique, a data processing system having a host computer that initiates only PIT copying operations of the first type, such as zSeries server that initiates Flashcopy operations, can be used in conjunction with storage systems that support second-type PIT copying operations such as SNAP. This can be of particular benefit when the second-type PIT copying operation has certain capabilities not present in the first-type PIT copying operation. Specific examples of such expanded capabilities include the following:

Host enabled, no need to upgrade microcode to enable new features

On consistency operation, read I/O is allowed to be processed

Allow FlashCopy and Snap on the same devices

Allow FlashCopy to Virtual Devices

Default to an incremental FlashCopy if a session already exists

Allow more than one hop on remote FlashCopy

Allow incremental FlashCopy at dataset level

Allow FlashCopy across physical controllers

Perform remote FlashCopy via Remote Data Facility (RDF) (versus PPRC only)

Allow multiple Consistency Groups within a logical subsystem (LSS)

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
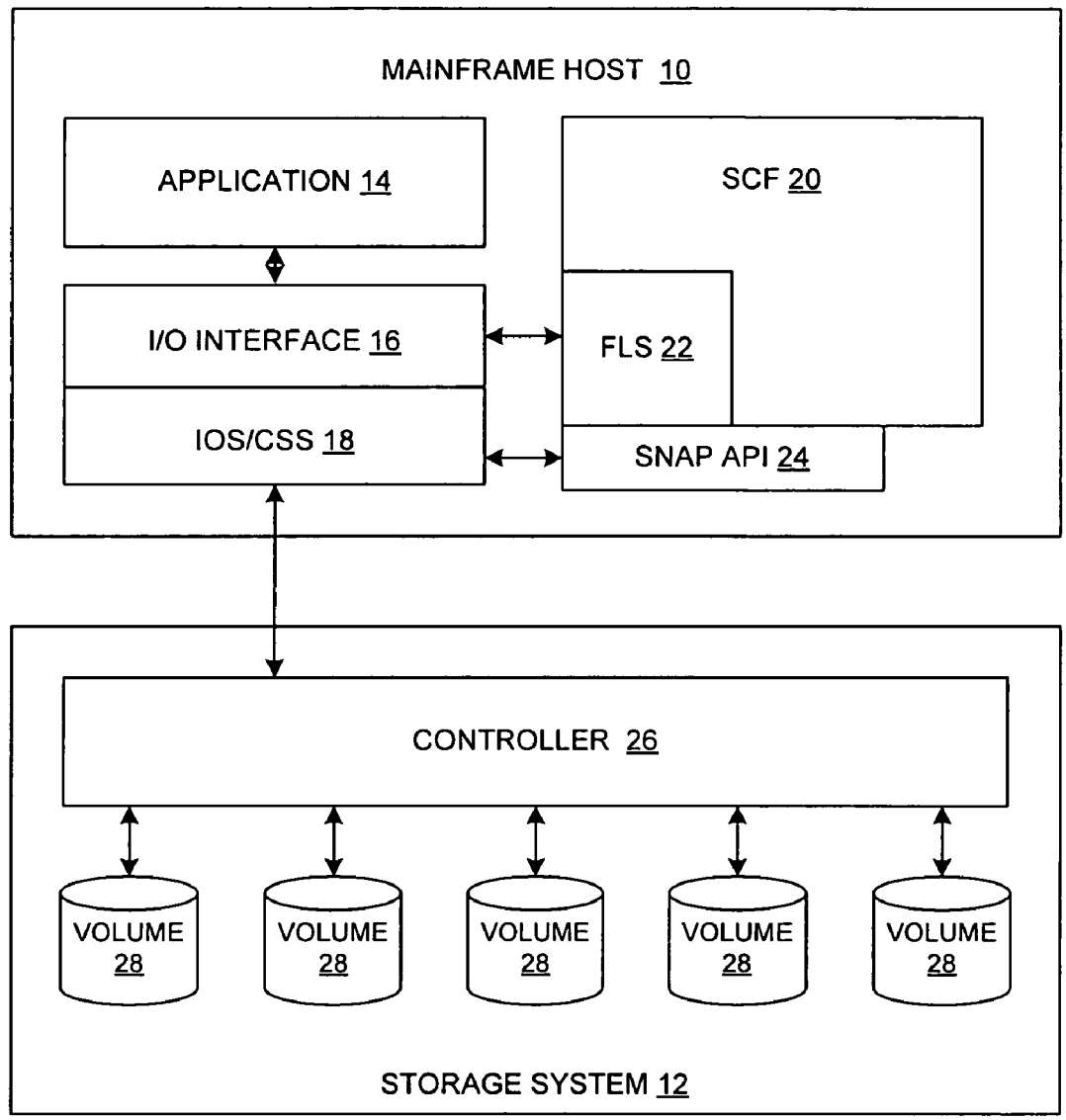
FIG. 1 is a block diagram of a data processing system in accordance with the present invention.

FIG. 1 shows a data processing system including a mainframe host computer (mainframe host) 10 coupled to a storage system 12. In an exemplary embodiment, the mainframe host 10 may be a zSeries® server sold by IBM Corporation, and the storage system 12 may be a SYMMETRIX® storage system sold by EMC Corporation.

The mainframe host 10 includes a storage-related application program (application) 14 that performs storage-related input/output (I/O) operations via an I/O interface 16 and I/O Supervisor/Channel Subsystem (IOS/CSS) 18 (also referred to as an I/O subsystem herein). Also in the mainframe host 10 is a Symmetrix Control Facility (SCF) 20 which includes an operating environment shown as FLS 22, as well as a SNAP application program interface (SNAP API) 24. The SCF 20 is a bundle of software that can be included on a zSeries platform specifically to support third-party storage systems 12 such as SYMMETRIX systems.

The storage system 12 includes a controller 26 and a number of storage volumes 28. In operation, the controller 26 receives storage requests (reads, writes) from the mainframe host 10 and accesses the data stored on the corresponding volumes 28. Although not shown in FIG. 1, the storage system 12 may include a cache disposed between the controller 28 and the volumes 28 for reduced latency and improved performance. Those skilled in the art will appreciate that the presently disclosed techniques may be used either with or without such a cache.

In one embodiment, the storage-related I/O operations of the application 14 may include issuing I/O commands of a data copying utility or service known as Flashcopy®, a registered trademark of IBM Corporation. Generally, Flashcopy can be used to create "point-in-time" copies of logical volumes (in whole or in part) which may be used for any of a variety of purposes, including for example backup, testing, data mining/analysis, etc. In data processing systems in which an IBM mainframe host is coupled to an IBM Enterprise Storage System (ESS), the ESS includes operating firmware that responds to Flashcopy commands and carries out Flashcopy operations on storage volumes of the ESS. In the system of FIG. 1, it is assumed that the storage system 12 supports a different type of point-in-time copying service from the type that is invoked by the application 14. In the case of a SYMMETRIX storage system for example, it may support a point-in-time copying service referred to as SNAP (a reference to the "snapshot" nature of the service). Much of the present description is based on an embodiment in which Flashcopy commands are being carried out via SNAP in particular. However, those skilled in the art will appreciate that the disclosed techniques are applicable to more generally to systems in which a first point-in-time (PIT) copying service is emulated via a second, different PIT copying service.

As known in the art, I/O processing in the mainframe host 10 may take the form of I/O commands that are executed by the application 14 and performed by the IOS/CSS 18 in the form of "channel programs" that include collections of "channel control words" or CCWs. This general form may be used for all I/O activity, whether related to Flashcopy or not. The present description focuses specifically on Flashcopy-related I/O operations initiated by the application 14. It is assumed that these I/O operations fall into one of three categories as follows:

1. I/O operations that can be executed unmodified, because the CCWs in the channel programs are not of interest from the perspective of emulating Flashcopy via SNAP.
2. I/O operations having CCWs of interest but requiring only a "back-end" modification of results rather than a translation of the CCW into a corresponding SNAP operation.
3. I/O operations having CCWs that require translation into corresponding SNAP operations.

Specific examples of CCWs in categories 2 and 3 are given below.

Figure 2:
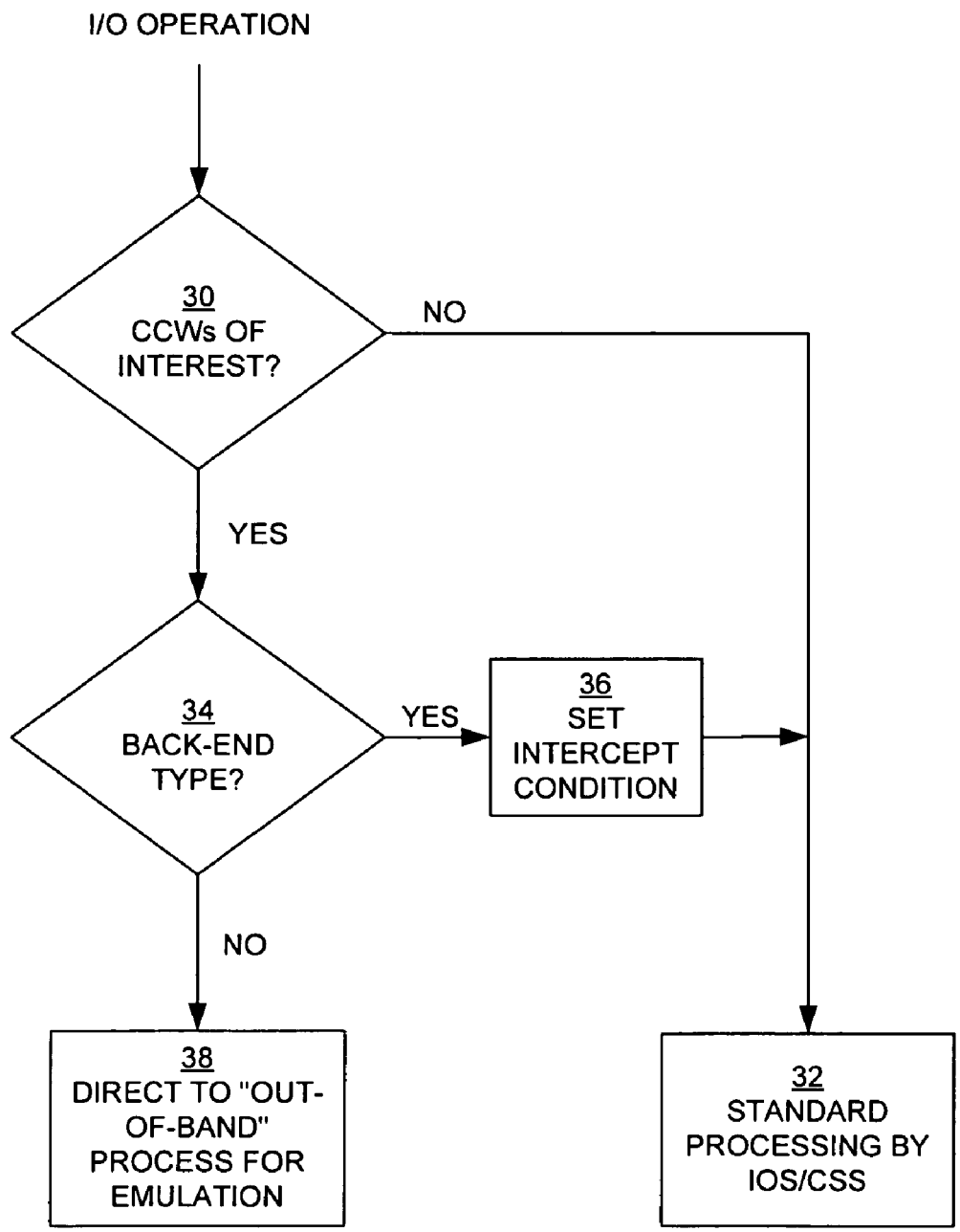
FIG. 2 is a flow diagram depicting a first part of an emulation of a first point-in-time (PIT) copying operation as carried out in the data processing system of FIG. 1.

FIG. 2 illustrates the high-level approach used in carrying out Flashcopy commands via the SNAP functions provided by the storage system 12 of FIG. 1. In step 30, it is determined whether an I/O operation initiated by the application 14 includes CCWs of interest, i.e., CCWs that require some type of modification for purposes of emulating Flashcopy over SNAP. If not, then in step 32 the I/O operation is performed in a standard manner by the IOS/CSS 18. If so, then in step 34 it is determined whether the I/O operation is of a "back-end" type, and if so then at step 36 an "intercept" condition is set and the I/O operation proceeds to the otherwise standard processing of step 32. The intercept condition is utilized for back-end processing as described below. If in step 34 the I/O operation is deemed not to be a back-end type, then at step 38 the operation is directed to an "out-of-band" process that performs the functions of certain CCWs using corresponding SNAP functions. In all cases, upon completion of the I/O, a validly formatted result is returned to the application 14.

Figure 3:
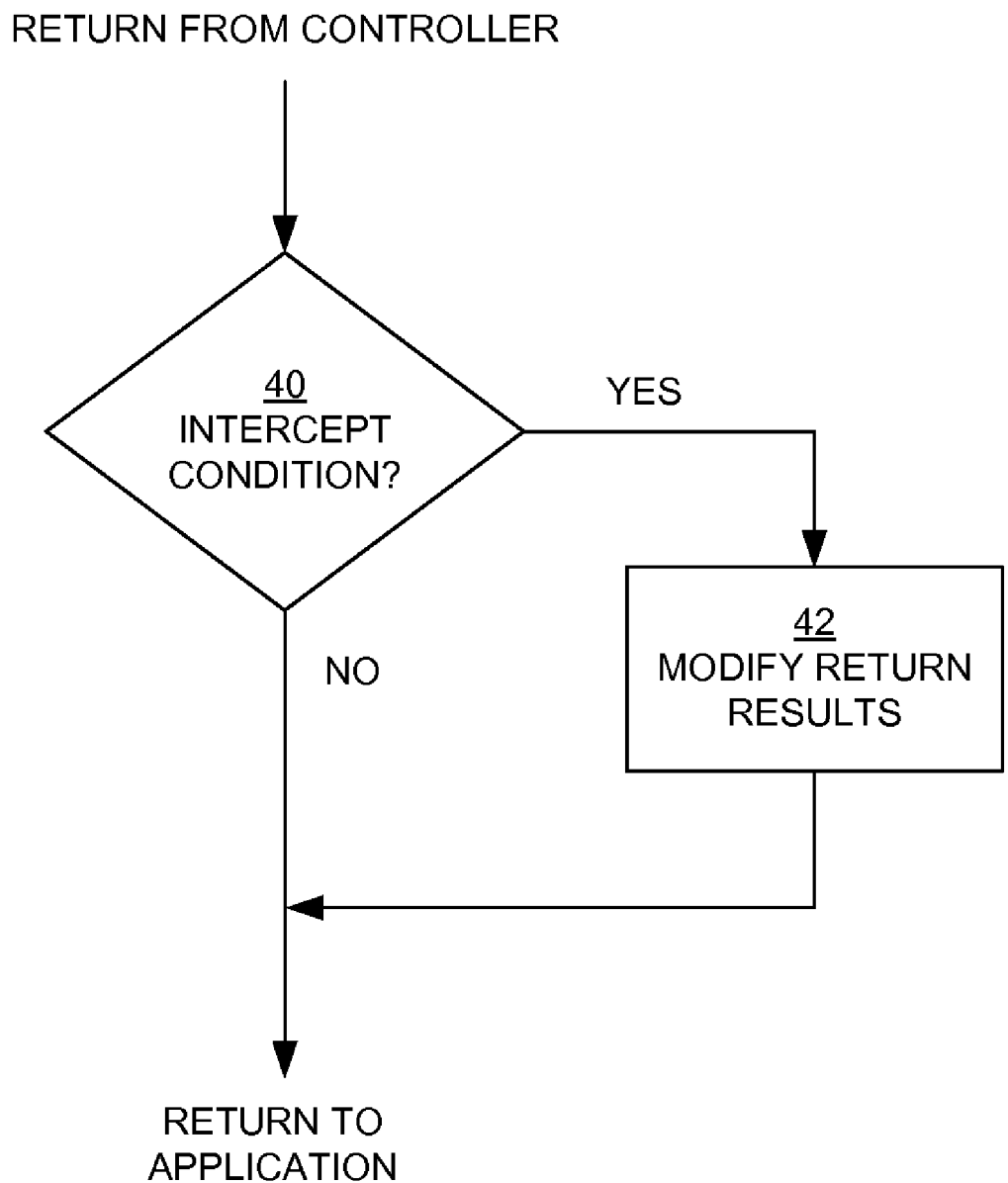
FIG. 3 is a flow diagram depicting a second part of the emulation of the first PIT copying operation.

FIG. 3 generally illustrates the above-mentioned "back-end" processing. When an I/O operation is complete as indicated by a return from the controller 26, at step 40 it is determined whether the intercept condition is set. If so, then at step 42 the return results are modified in an appropriate manner, which is generally to indicate that Flashcopy is allowed for the device of interest (this is necessary, for example, to override the contrary indication that would be provided by a third-party storage system 12 that lacks specific Flashcopy support). Specific types of back-end commands are shown below. Subject to such conditional modification of results, the I/O then returns to the application 14.

Figure 4:
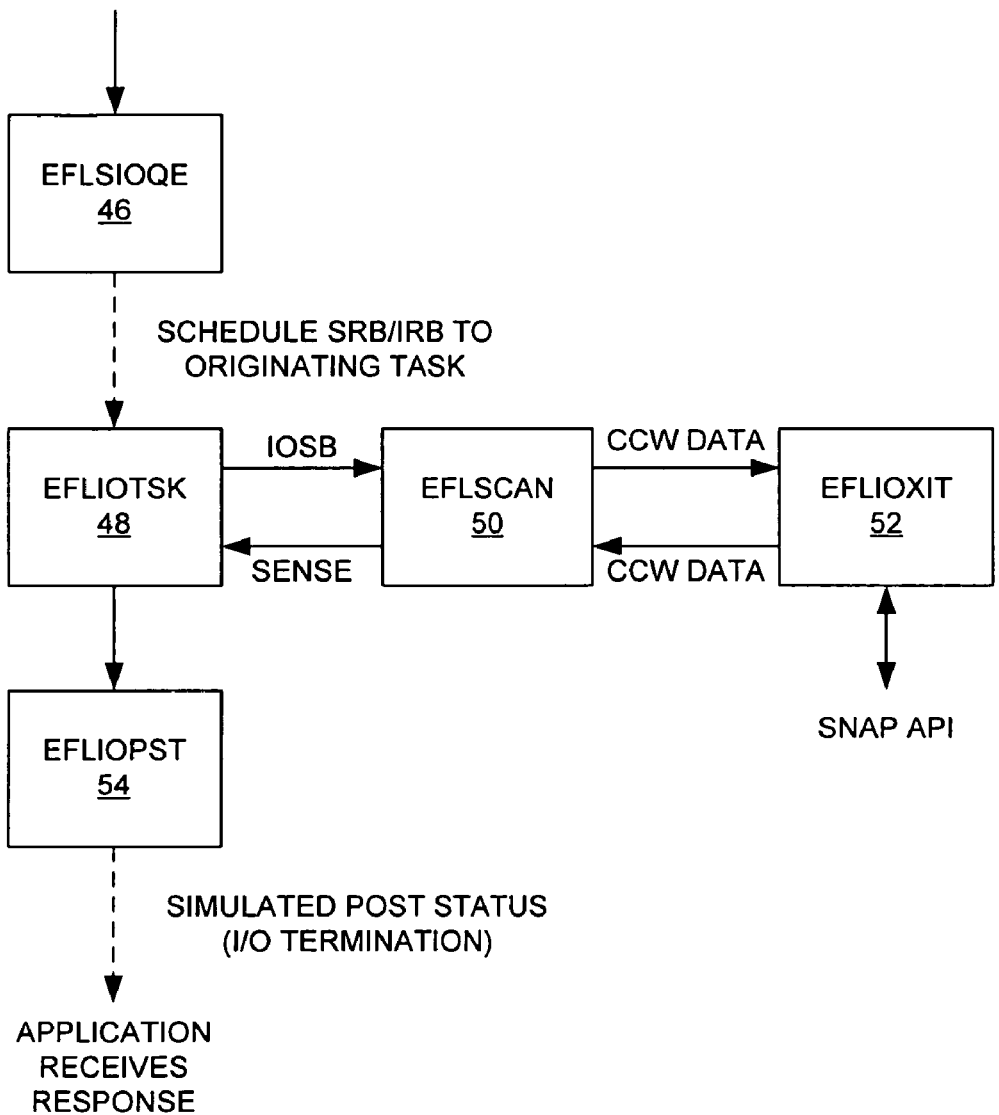
FIG. 4 is a diagram depicting out-of-band processing of certain I/O instructions as part of the emulation of the first PIT copying operation.

FIG. 4 illustrates the above-referenced "out-of-band" process entered via step 38 of FIG. 2. When the application 14 issues a Start I/O command, a queue entry EFLSIOQE 46 is created, which is scheduled for execution as a Service Request Block (SRB) or Interruption Request Block (IRB). The SRB or IRB is scheduled to the task that initiated the I/O operation, which allows the SNAP-related processing to remain owned by the task.

The task EFLIOTSK 48 passes the I/O Supervisory Block (IOSB) associated with the I/O operation to a module EFLSCAN 50, which is invoked along with a second module EFLIOXIT 52 as a CCW monitor. EFLSCAN 50 passes CCWs of interest to EFLIOXIT, which translates them into corresponding calls to the SNAP API 24. Specific CCWs and translations are described below. EFLSCAN 50 has access to a "sense area" that can be returned by EFLIOXIT 52 when a condition is detected, such condition typically being a command reject with a reason code. For those conditions, a unit check is simulated to the application 14 via post-status processing EFLIOPST 54. The application 14 can then process the returned sense data.

The following table summarizes, for the emulation of Flashcopy by SNAP in particular, the CCWs of interest and the manner in which they are handled:

| CCW | How handled | Notes |
| --- | --- | --- |
| SNSS | Back-end | |
| Read Msg ID | Out of band | |
| PSF/DSO | Both | See below |
| RSSD | Both | Can be intercepted or handled by SNAP routines |

| Specific handling of PSF/DSO commands | | |
| --- | --- | --- |
| CCW | How handled | SNAP API Routines |
| Prepare RSSD | Back-end | |
| Establish FC | Out of band | Query Session Details (for Incremental and Restore Handling) Snap Establish |
| Withdraw FC | Out of band | Snap Change nocopy to copy Snap Stop snap to device Snap Cleanup on source device |
| Consistency Group Thaw | Out of band | Snap Activate |
| Read Features | Back-end | |
| Read relationship table | Out of band | Snap Session List Snap Extent Information |
| FC capability | Out of band | Snap Session List Snap Extent Information Snap Query Indirect Snap Query Protection |

While this invention has been particularly shown and described with references to preferred embodiments thereof, it will be understood by those skilled in the art that various changes in form and details may be made therein without departing from the spirit and scope of the invention as defined by the appended claims.

In particular, it will be appreciated by those skilled in the art that the basic functionality of carrying out FlashCopy operations using corresponding SNAP operations may be realized within a storage controller such as controller 26 (FIG. 1) rather than within a mainframe host such as host 10. In such an embodiment, the FlashCopy commands are not intercepted or modified within the host 10 as described above, but rather simply sent to the storage system 12 via the I/O interface 16 and IOS/CSS 18 in the normal fashion. The controller 26 then performs a mapping or translation of the FlashCopy commands to corresponding SNAP commands such as described in the above table, and provides appropriate FlashCopy responses to the host 10 based on the results of the execution of the SNAP commands. It should be noted that in such an embodiment there is no use of the "back-end" processing described above, which is specific to the host-based technique. All FlashCopy commands are carried out by firmware within the controller 26, and corresponding responses are returned to the host in accordance with the specification of the FlashCopy commands.

What is claimed is:

1. A method of processing input/output (I/O) commands of a first type of point-in-time (PIT) copy operation in a data processing system, the data processing system including a host computer system having an application operative to generate the I/O commands for the first type of PIT copy operation, the first type of PIT copy operation being directed to respective storage volumes of a data storage system that is capable of performing a second type of PIT copy operation, the method being performed as part of an emulation of the first type of PIT copy operation, comprising:

translating selected ones of the I/O commands of the first type of PIT copy operation to corresponding I/O commands of the second type of PIT copy operation;

carrying out the I/O commands of the second type of PIT copy operation resulting from the translation;

returning results to the application according to the first type of PIT copy operation such that the application is unaware of the use of the second type of PIT copy operation;

determining whether the I/O commands of the first type of PIT copy operation require modification for purposes of the emulation, and if so whether they are of a back-end type or an out-of-band type, the back-end I/O commands requiring modification of results reported to the application upon completion and the out-of-band I/O commands requiring substitution by corresponding I/O commands of the second type of PIT copy operation for purposes of the emulation;

for those of the I/O commands not requiring modification for purposes of the emulation, processing such I/O commands without modification via an I/O subsystem of the host computer;

for the back-end I/O commands, (i) setting an intercept condition, (ii) processing the back-end I/O commands via the I/O subsystem, and (iii) upon completion of the back-end I/O commands with the intercept condition set, modifying results of the back-end I/O commands so as to indicate to the application that the first type of PIT copy operation can be performed on the storage volumes to which the first type of PIT copy operation is directed; and for the out-of-band I/O commands, (i) processing corresponding I/O commands of the second type of PIT copy operation in lieu of the out-of-band I/O commands, and (ii) upon completion of the processed I/O commands, returning corresponding results to the application as though the out-of-band I/O commands had been processed by the I/O subsystem.

2. A method according to claim 1, wherein the host computer system further includes a control facility and an application programming interface (API) for the second type of PIT copy operation, and wherein the processing of corresponding I/O commands of the second type of PIT copy operation includes invoking, by the control facility, corresponding functions of the API.

3. A method according to claim 2, wherein the control facility includes:

a queue module operative in response to a Start I/O command of the application to create a corresponding queue entry which is scheduled for execution as a selected one of a Service Request Block (SRB) and an Interruption Request Block (IRB), the Start I/O command being associated with a corresponding I/O operation;

a scan module operative to scan an I/O Supervisory Block (IOSB) associated with the I/O operation to identify channel control words (CCWs) that require out-of-band processing; and a translation module operative to translate those CCWs identified by the scan module into corresponding calls to the API.

4. A method according to claim 3, wherein the scan module has access to a sense area returned by the translation module when a condition is detected, and wherein the control facility further includes a post-processing module operative to simulate a unit check to the application to enable the application to process sense data returned in the sense area.

5. A method according to claim 1, wherein the out-of-band I/O commands include respective commands for establishing and withdrawing a PIT copy relationship between respective storage devices, and wherein the corresponding I/O commands of the second type of PIT copy operation include a query command for obtaining details of a session utilized as part of the second type of PIT copy operation.

6. A method according to claim 1, wherein the out-of-band I/O commands include an I/O command for reading a relationship table having information about one or more PIT copy relationships between respective storage devices, and wherein the corresponding I/O commands of the second type of PIT copy operation include a session list command and an extent information command for obtaining information about (i) sessions utilized as part of the second type of PIT copy operation and (ii) extents of the storage devices forming part of such sessions.

7. A method according to claim 6, wherein the out-of-band I/O commands further include an I/O command for obtaining capability information, and wherein the corresponding I/O commands of the second type of PIT copy operation further include a query indirect command and a query protection command for obtaining indirection and protection information.

8. A host computer system, comprising:
  a storage-related application operative to generate input/output (I/O) commands as part of an emulation of a first type of point-in-time (PIT) copy operation, the first type of PIT copy operation being directed to respective storage volumes of a data storage system that is capable of performing a second type of PIT copy operation;
  an I/O subsystem coupled to the data storage system; and
  a control facility application operative to:
    (A) determine whether the I/O commands require modification for purposes of the emulation, and if so whether they are of a back-end type or an out-of-band type, the back-end I/O commands requiring modification of results reported to the application upon completion and the out-of-band I/O commands requiring substitution by corresponding I/O commands of the second type of PIT copy operation for purposes of the emulation;
    (B) for those of the I/O commands not requiring modification for purposes of the emulation, process such I/O commands without modification via the I/O subsystem of the host computer;
    (C) for the back-end I/O commands, (i) set an intercept condition, (ii) process the back-end I/O commands via the I/O subsystem, and (iii) upon completion of the back-end I/O commands with the intercept condition set, modify results of the back-end I/O commands so as to indicate to the application that the first type of PIT copy operation can be performed on the storage volumes to which the first type of PIT copy operation is directed; and
    (D) for the out-of-band I/O commands, (i) process corresponding I/O commands of the second type of PIT copy operation in lieu of the out-of-band I/O commands, and (ii) upon completion of the processed I/O commands, return corresponding results to the application as though the out-of-band I/O commands had been processed by the I/O subsystem.

9. A host computer system according to claim 8, further including a control facility and an application programming interface (API) for the second type of PIT copy operation, and wherein the processing of corresponding I/O commands of the second type of PIT copy operation includes invoking, by the control facility, corresponding functions of the API.

10. A host computer system according to claim 9, wherein the control facility includes:
  a queue module operative in response to a Start I/O command of the application to create a corresponding queue entry which is scheduled for execution as a selected one of a Service Request Block (SRB) and an Interruption Request Block (IRB), the Start I/O command being associated with a corresponding I/O operation;
  a scan module operative to scan an I/O Supervisory Block (IOSB) associated with the I/O operation to identify channel control words (CCWs) that require out-of-band processing; and
  a translation module operative to translate those CCWs identified by the scan module into corresponding calls to the API.

11. A host computer system according to claim 10, wherein the scan module has access to a sense area returned by the translation module when a condition is detected, and wherein the control facility further includes a post-processing module operative to simulate a unit check to the application to enable the application to process sense data returned in the sense area.

12. A host computer system according to claim 8, wherein the out-of-band I/O commands include respective commands for establishing and withdrawing a PIT copy relationship between respective storage devices, and wherein the corresponding I/O commands of the second type of PIT copy operation include a query command for obtaining details of a session utilized as part of the second type of PIT copy operation.

13. A host computer system according to claim 8, wherein the out-of-band I/O commands include an I/O command for reading a relationship table having information about one or more PIT copy relationships between respective storage devices, and wherein the corresponding I/O commands of the second type of PIT copy operation include a session list command and an extent information command for obtaining information about (i) sessions utilized as part of the second type of PIT copy operation and (ii) extents of the storage devices forming part of such sessions.

14. A host computer system according to claim 13, wherein the out-of-band I/O commands further include an I/O command for obtaining capability information, and wherein the corresponding I/O commands of the second type of PIT copy operation further include a query indirect command and a query protection command for obtaining indirection and protection information.

* * * * *